United States Patent
Fujii

(10) Patent No.: US 12,544,170 B2
(45) Date of Patent: Feb. 10, 2026

(54) MEDICAL MANIPULATOR

(71) Applicant: OLYMPUS CORPORATION, Tokyo (JP)

(72) Inventor: Yuta Fujii, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 787 days.

(21) Appl. No.: 17/899,778

(22) Filed: Aug. 31, 2022

(65) Prior Publication Data

US 2022/0409315 A1 Dec. 29, 2022

Related U.S. Application Data

(63) Continuation of application No. PCT/JP2020/010140, filed on Mar. 10, 2020.

(51) Int. Cl.
*A61B 34/00* (2016.01)

(52) U.S. Cl.
CPC .................................. *A61B 34/71* (2016.02)

(58) Field of Classification Search
CPC ...... A61B 18/1492; A61B 2018/00601; A61B 2034/301; A61B 34/37; A61B 34/71
See application file for complete search history.

(56) References Cited

U.S. PATENT DOCUMENTS 5,782,797 A * 7/1998 Schweich, Jr. ... A61M 25/0026
604/523

5,827,323 A 10/1998 Klieman et al.
6,666,854 B1 12/2003 Lange
(Continued)

FOREIGN PATENT DOCUMENTS

EP 2133035 A1 12/2009
EP 2160995 A1 3/2010
(Continued)

OTHER PUBLICATIONS

International Search Report dated Apr. 21, 2020 issued in PCT/JP2020/010140.
(Continued)

*Primary Examiner* — Mohamed G Gabr
*Assistant Examiner* — Khoa Tan Le
(74) *Attorney, Agent, or Firm* — Scully, Scott, Murphy & Presser, P.C.

(57) ABSTRACT

A medical manipulator includes a multi-lumen tube including a flexible portion and a bending portion at a distal end of the flexible portion, a distal-end portion at a distal end of the bending portion, a proximal-end portion at a proximal end of the flexible portion, wires causing the bending portion to be bent, a reinforcement coil one end thereof being secured to the distal-end portion and the other end thereof being secured to the proximal-end portion, a flexible-portion cover member, and a bending-portion cover member formed more flexible than the flexible-portion cover member. The flexible and bending portions include a first lumen passing through the tube and into which the coil is inserted, and second lumens passing through the tube at positions farther outside than the first lumen is and into which the wires are inserted. The coil is disposed along an inner surface of the first lumen.

11 Claims, 7 Drawing Sheets

(56) References Cited

U.S. PATENT DOCUMENTS

| | | | | |
|---|---|---|---|---|
| 8,282,543 | B2 * | 10/2012 | Ishiguro | A61B 34/74 600/106 |
| 10,206,711 | B1 | 2/2019 | Jadhav et al. | |
| 2002/0120252 | A1 | 8/2002 | Brock et al. | |
| 2002/0128633 | A1 | 9/2002 | Brock et al. | |
| 2002/0128661 | A1 | 9/2002 | Brock et al. | |
| 2002/0128662 | A1 | 9/2002 | Brock et al. | |
| 2002/0133173 | A1 | 9/2002 | Brock et al. | |
| 2002/0138082 | A1 | 9/2002 | Brock et al. | |
| 2003/0036748 | A1 | 2/2003 | Cooper et al. | |
| 2003/0050649 | A1 | 3/2003 | Brock et al. | |
| 2003/0135204 | A1 | 7/2003 | Lee et al. | |
| 2004/0138700 | A1 | 7/2004 | Cooper et al. | |
| 2005/0090809 | A1 | 4/2005 | Cooper et al. | |
| 2005/0182298 | A1 | 8/2005 | Ikeda et al. | |
| 2005/0216033 | A1 | 9/2005 | Lee et al. | |
| 2005/0272975 | A1 * | 12/2005 | McWeeney | A61B 1/307 600/172 |
| 2006/0030753 | A1 | 2/2006 | Boutillette et al. | |
| 2006/0178556 | A1 | 8/2006 | Hasser et al. | |
| 2006/0252993 | A1 | 11/2006 | Freed et al. | |
| 2007/0021737 | A1 | 1/2007 | Lee | |
| 2007/0276430 | A1 | 11/2007 | Lee et al. | |
| 2008/0065116 | A1 | 3/2008 | Lee et al. | |
| 2008/0177284 | A1 | 7/2008 | Lee et al. | |
| 2008/0188868 | A1 | 8/2008 | Weitzner et al. | |
| 2008/0188869 | A1 | 8/2008 | Weitzner et al. | |
| 2008/0188871 | A1 | 8/2008 | Smith et al. | |
| 2008/0188890 | A1 | 8/2008 | Weitzner et al. | |
| 2008/0221391 | A1 | 9/2008 | Weitzner et al. | |
| 2008/0243176 | A1 | 10/2008 | Weitzner et al. | |
| 2009/0069842 | A1 | 3/2009 | Lee et al. | |
| 2009/0299344 | A1 | 12/2009 | Lee et al. | |
| 2010/0022827 | A1 | 1/2010 | Naito | |
| 2010/0030018 | A1 | 2/2010 | Fortier et al. | |
| 2010/0063354 | A1 | 3/2010 | Hashimoto et al. | |
| 2010/0168722 | A1 | 7/2010 | Lee et al. | |
| 2010/0217072 | A1 | 8/2010 | Kondoh et al. | |
| 2010/0249497 | A1 | 9/2010 | Peine et al. | |
| 2011/0004225 | A1 | 1/2011 | Choi et al. | |
| 2011/0144656 | A1 | 6/2011 | Lee et al. | |
| 2011/0163146 | A1 | 7/2011 | Ortiz et al. | |
| 2011/0184459 | A1 | 7/2011 | Malkowski et al. | |
| 2011/0213300 | A1 | 9/2011 | McWeeney et al. | |
| 2012/0065628 | A1 | 3/2012 | Naito | |
| 2012/0190920 | A1 | 7/2012 | Hasser et al. | |
| 2012/0209073 | A1 | 8/2012 | McWeeney et al. | |
| 2012/0245567 | A1 | 9/2012 | Lee et al. | |
| 2012/0302832 | A1 | 11/2012 | Inada | |
| 2013/0012958 | A1 | 1/2013 | Marczyk et al. | |
| 2013/0317522 | A1 | 11/2013 | Nishizawa et al. | |
| 2014/0066706 | A1 | 3/2014 | McWeeney et al. | |
| 2015/0164524 | A1 | 6/2015 | Malkowski et al. | |
| 2015/0196364 | A1 | 7/2015 | Perez, III et al. | |
| 2015/0238180 | A1 | 8/2015 | Weitzner et al. | |
| 2015/0305797 | A1 | 10/2015 | Hassoun | |
| 2015/0313452 | A1 | 11/2015 | Hasser et al. | |
| 2016/0287346 | A1 * | 10/2016 | Hyodo | A61B 34/71 |
| 2016/0353979 | A1 | 12/2016 | Hashizume et al. | |
| 2017/0105746 | A1 | 4/2017 | O'Keefe | |
| 2017/0231475 | A1 | 8/2017 | McWeeney et al. | |
| 2017/0311778 | A1 | 11/2017 | Hasser et al. | |
| 2018/0078323 | A1 | 3/2018 | Nakadate et al. | |
| 2018/0087975 | A1 | 3/2018 | Ellis et al. | |
| 2019/0142538 | A1 | 5/2019 | Hyodo et al. | |
| 2019/0231466 | A1 | 8/2019 | Weitzner et al. | |
| 2020/0069300 | A1 | 3/2020 | Cruz et al. | |
| 2020/0107700 | A1 | 4/2020 | Hasser et al. | |
| 2020/0170701 | A1 | 6/2020 | O'Keefe | |
| 2020/0170738 | A1 | 6/2020 | Hasegawa | |
| 2020/0305906 | A1 | 10/2020 | O'Keefe | |
| 2020/0383740 | A1 | 12/2020 | Hyodo et al. | |
| 2021/0145470 | A1 | 5/2021 | Holsten | |
| 2021/0153727 | A1 | 5/2021 | Hasegawa | |
| 2021/0321861 | A1 | 10/2021 | McWeeney et al. | |
| 2021/0386428 | A1 | 12/2021 | Larsen et al. | |
| 2022/0054208 | A1 | 2/2022 | Cooper et al. | |
| 2022/0167836 | A1 | 6/2022 | Thissen et al. | |
| 2022/0175409 | A1 | 6/2022 | O'Keefe | |

FOREIGN PATENT DOCUMENTS

| | | |
|---|---|---|
| EP | 2529658 A1 | 12/2012 |
| EP | 3085324 A1 | 10/2016 |
| EP | 3284421 A1 | 2/2018 |
| JP | H08112352 A | 5/1996 |
| JP | 2000185013 A | 7/2000 |
| JP | 3712750 B2 | 11/2005 |
| JP | 2005305185 A | 11/2005 |
| JP | 3895755 B2 | 3/2007 |
| JP | 2007175502 A | 7/2007 |
| JP | 2010036039 A | 2/2010 |
| JP | 2010503457 A | 2/2010 |
| JP | 2010057919 A | 3/2010 |
| JP | 2011050748 A | 3/2011 |
| JP | 4989724 B2 | 8/2012 |
| JP | 2012525916 A | 10/2012 |
| JP | 2012245058 A | 12/2012 |
| JP | 2017512659 A | 5/2017 |
| JP | 2017164519 A | 9/2017 |
| JP | 2018534052 A | 11/2018 |
| JP | 2019034081 A | 3/2019 |
| JP | 2020018835 A | 2/2020 |
| WO | 2005094665 A2 | 10/2005 |
| WO | 2007120353 A2 | 10/2007 |
| WO | 2008020964 A2 | 2/2008 |
| WO | 2008033240 A2 | 3/2008 |
| WO | 2008070556 A1 | 6/2008 |
| WO | 2008126434 A1 | 10/2008 |
| WO | 2010129035 A2 | 11/2010 |
| WO | 2011145533 A1 | 11/2011 |
| WO | 2015087998 A1 | 6/2015 |
| WO | 2015093602 A1 | 6/2015 |
| WO | 2015126752 A1 | 8/2015 |
| WO | 2016166828 A1 | 10/2016 |
| WO | 2017068074 A1 | 4/2017 |
| WO | 2019030848 A1 | 2/2019 |
| WO | 2019039362 A1 | 2/2019 |
| WO | 2020017605 A1 | 1/2020 |
| WO | 2020039576 A1 | 2/2020 |

OTHER PUBLICATIONS

International Search Report dated Jun. 2, 2020 issued in PCT/JP2020/010141.

Related U.S. Appl. No. 17/899,753, filed Aug. 31, 2022.

US Office Action dated Jun. 30, 2025 received in U.S. Appl. No. 17/899,753.

* cited by examiner

FIG. 8

| AREA IN WHICH REINFORCEMENT COIL IS DISPOSED | WITH/WITHOUT REINFORCEMENT COIL | COMPRESSIVE DEFORMATION DUE TO PULLING OF BENDING WIRE | BENDING PORTION BENDABILITY | AMOUNT BY WHICH BENDING WIRE IS PULLED | EASE OF INSERTION INTO ENDOSCOPE CHANNEL |
|---|---|---|---|---|---|
| ENTIRE LENGTH OF MULTI-LUMEN TUBE | WITH | ○ (NO COMPRESSIVE DEFORMATION BOTH IN FLEXIBLE PORTION AND BENDING PORTION) | ○ (BEND WITHOUT COMPRESSIVE DEFORMATION) | ○ (SMALL) | ○ (EASY TO INSERT) |
| ENTIRE LENGTH OF MULTI-LUMEN TUBE | WITHOUT | × (COMPRESSIVE DEFORMATION BOTH IN FLEXIBLE PORTION AND BENDING PORTION) | × (DOES NOT BEND AND COMPRESSIVELY DEFORM) | × (LARGE) | △ (DIFFICULT TO INSERT) |
| FLEXIBLE PORTION ONLY | WITH | FLEXIBLE PORTION ○ (NO COMPRESSIVE DEFORMATION BENDING PORTION × (WITH COMPRESSIVE DEFORMATION) | × (DOES NOT BEND AND COMPRESSIVELY DEFORM) | △ | ○ (EASY TO INSERT) |

MEDICAL MANIPULATOR

CROSS-REFERENCE TO RELATED APPLICATIONS

This is a continuation of International Application PCT/JP2020/010140 which is hereby incorporated by reference herein in its entirety.

TECHNICAL FIELD

The present invention relates to a medical manipulator.

BACKGROUND ART

In the related art, there is a known medical manipulator that includes an inserted portion having a bending portion and a flexible portion, the flexible portion being provided with, in the interior thereof, multiple lumens through which a plurality of wires that cause the bending portion to be bent pass (for example, see Patent Literatures 1 and 2). In the medical manipulator, when the respective wires are pulled, stresses such as friction act on the multiple lumens, which causes the occurrence of compressive deformation in the multiple lumens. Because of this, the bending portion does not take a desired bent shape, and thus, the maneuverability of the bending portion is affected.

The medical manipulator described in Patent Literature 1 or 2 has flexibility and is bendable; however, contraction in the multiple lumens is prevented as a result of respectively accommodating coil sheaths, which have the property that they do not substantially contract in the longitudinal direction thereof, in the respective lumens of the flexible portion so as to serve as reinforcement members.

CITATION LIST

Patent Literature

{PTL 1} Publication of Japanese Patent No. 3895755
{PTL 2} Publication of Japanese Patent No. 3712750

SUMMARY OF INVENTION

An aspect of the present invention is a medical manipulator including: a multi-lumen tube that includes an elongated flexible portion having flexibility and a bendable bending portion disposed at a distal end of the flexible portion; a distal-end portion disposed at a distal end of the bending portion; a proximal-end portion disposed at a proximal end of the flexible portion; a plurality of wires that cause the bending portion to be bent by transmitting a motive force from the proximal-end portion to the bending portion; a reinforcement coil in which one end thereof in a longitudinal direction is secured to the distal-end portion and the other end thereof in the longitudinal direction is secured to the proximal-end portion; a flexible-portion cover member that is disposed in an area surrounding the flexible portion; and a bending-portion cover member that is disposed in an area surrounding the bending portion and that is formed from a material having a greater flexibility than the flexible-portion cover member, wherein the flexible portion and the bending portion include a first lumen, which passes through, in the longitudinal direction, the multi-lumen tube at a position containing a center axis thereof and into which the reinforcement coil is inserted, and a plurality of second lumens, which pass through, in the longitudinal direction, the multi-lumen tube at positions farther outside than the first lumen is and into which the plurality of wires are inserted, and the reinforcement coil is disposed along an inner surface of the first lumen.

BRIEF DESCRIPTION OF DRAWINGS

FIG. 8 is a table comparing a configuration in which a reinforcement coil is provided over the entire length of the multi-lumen tube, a configuration in which the reinforcement coil is provided in a portion thereof, and a configuration in which the reinforcement coil is not provided.

DESCRIPTION OF EMBODIMENT

A medical manipulator according to an embodiment of the present invention will be described below with reference to the drawings.

Figure 1:
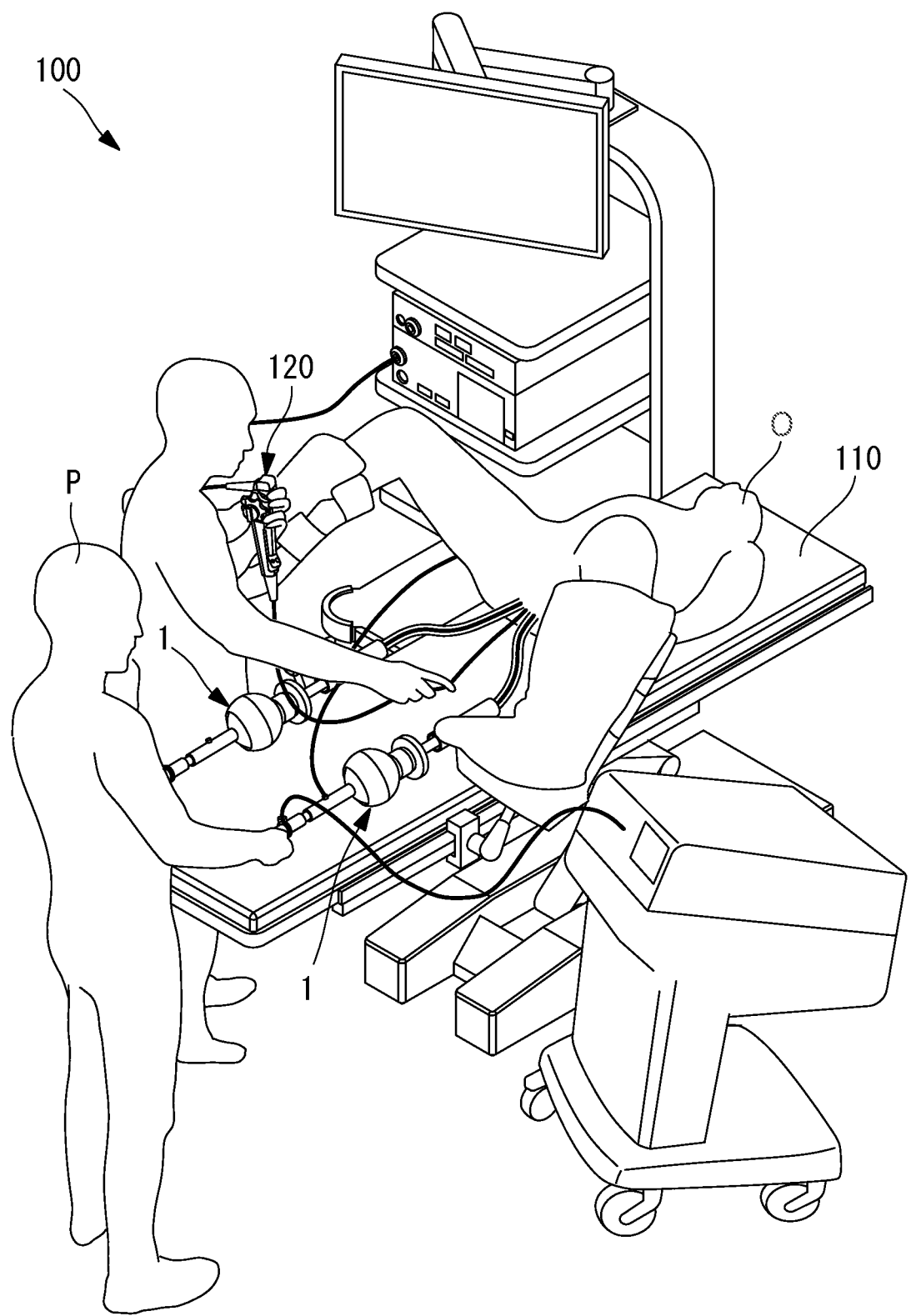
FIG. 1 shows an overall configuration diagram of a medical manipulator system including a medical manipulator according to an embodiment of the present invention.

A medical manipulator 1 according to this embodiment is included in a medical manipulator system 100 shown in FIG. 1 and is a treatment tool that is inserted, via his/her anus, into a body cavity of a patient O laying down on an operating table 110, together with an endoscope 120.

Figure 2:
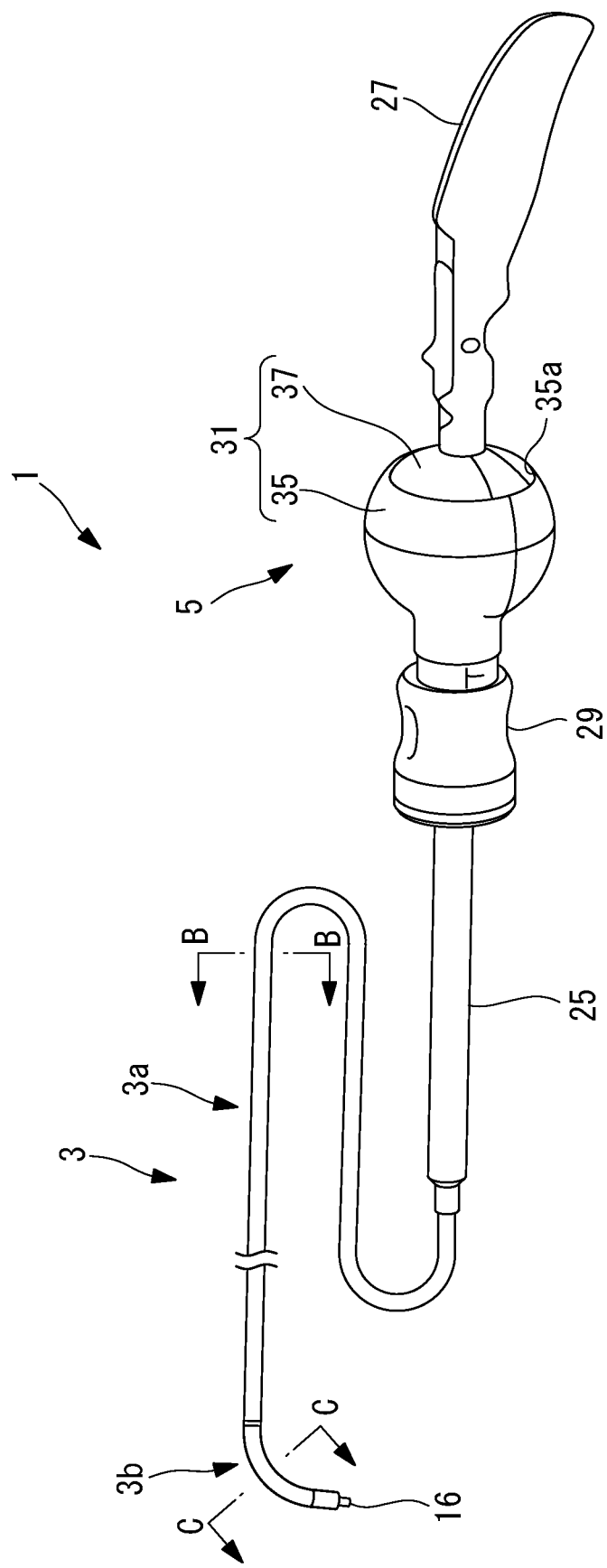
FIG. 2 shows an overall configuration diagram of the medical manipulator in FIG. 1.

As shown in FIGS. 1 and 2, the medical manipulator 1 includes: a flexible, long flexible shaft 3; and an operating unit (proximal-end portion) 5 that is connected to a proximal end of the flexible shaft 3 and that is manually operated by an operator P. In addition, as shown in FIGS. 3, 4, and 5, the medical manipulator 1 includes a cable (electric cable) 7 for supplying power and bending wires (wires) 9 that transmit, to the flexible shaft 3, a motive force associated with an operation performed on the operating unit 5.

Figure 3:
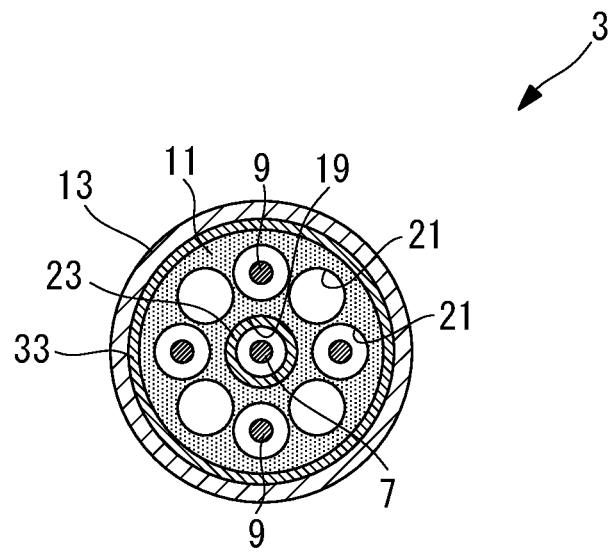
FIG. 3 is a sectional view taken along B-B in FIG. 2.
Figure 4:
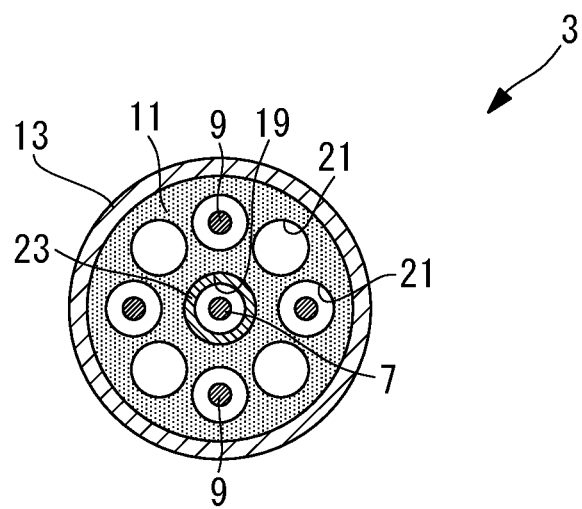
FIG. 4 is a sectional view taken along C-C in FIG. 2.
Figure 5:
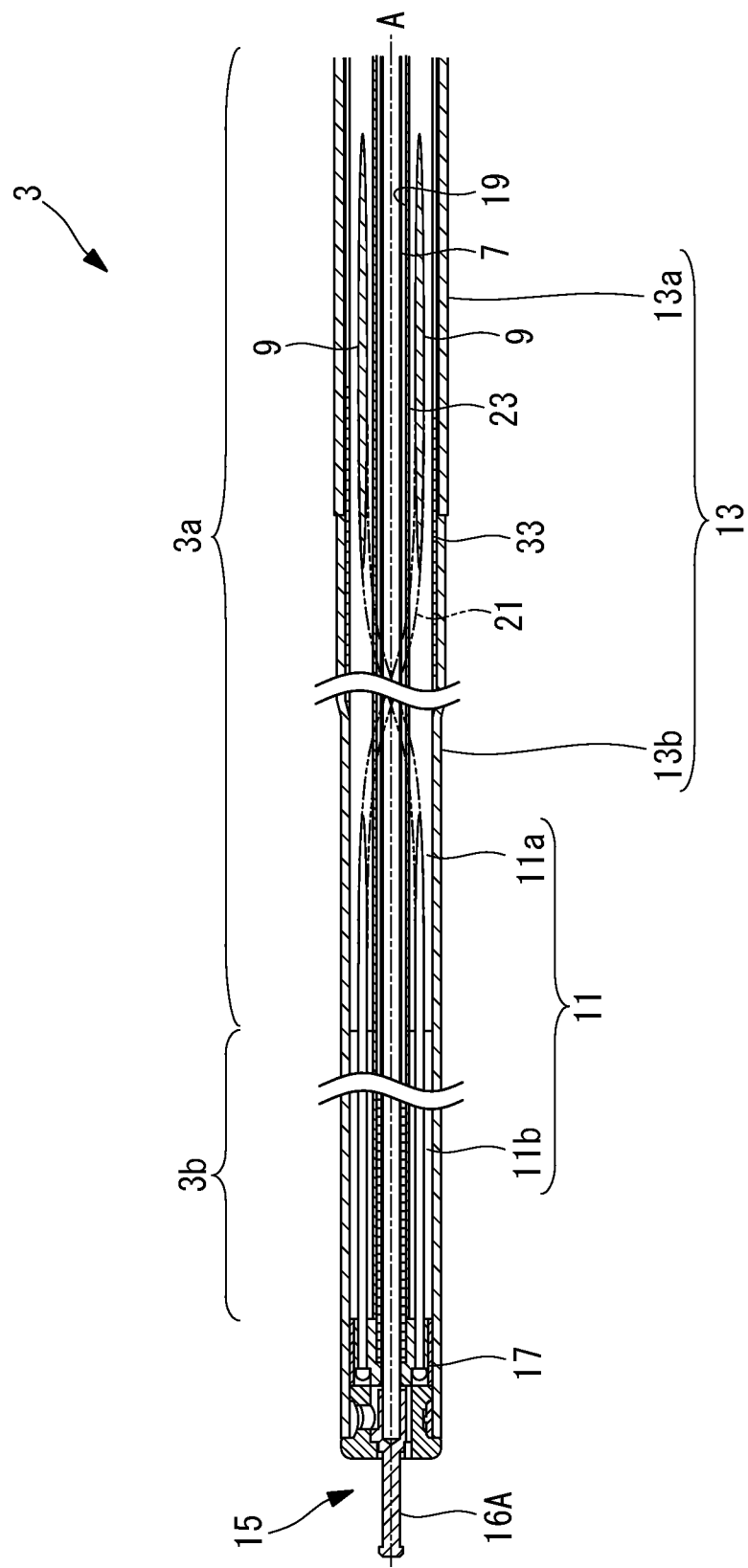
FIG. 5 is a sectional view in which a flexible shaft in FIG. 2 is cut in a longitudinal axis direction.

As shown in FIGS. 3, 4, and 5, the flexible shaft 3 includes: a tubular multi-lumen tube 11 that has a plurality of lumens 19 and 21 into which the cable 7 and the bending wires 9 are inserted; a tubular cover 13 that covers an area surrounding the multi-lumen tube 11; a distal-end portion 15 that is disposed at a distal end of the multi-lumen tube 11; and a reinforcement member 17 consisting of a flexible, tubular member that reinforces the connection between the distal-end portion 15 and the multi-lumen tube 11.

The distal-end portion 15 is provided with a high-frequency knife (end effector) 16 for treating biological tissue. The cable 7 supplies required power to the high-frequency knife 16 in accordance with the operation performed on the operating unit 5. Consequently, it is possible to execute treatment such as excision of an affected part by means of the high-frequency knife 16. Note that, in addition to that example, the same effect could be afforded with a configuration in which the high-frequency knife 16 is replaced with gripping forceps and the cable 7 is replaced with a wire for driving the gripping forceps to be opened/closed.

Figure 6:
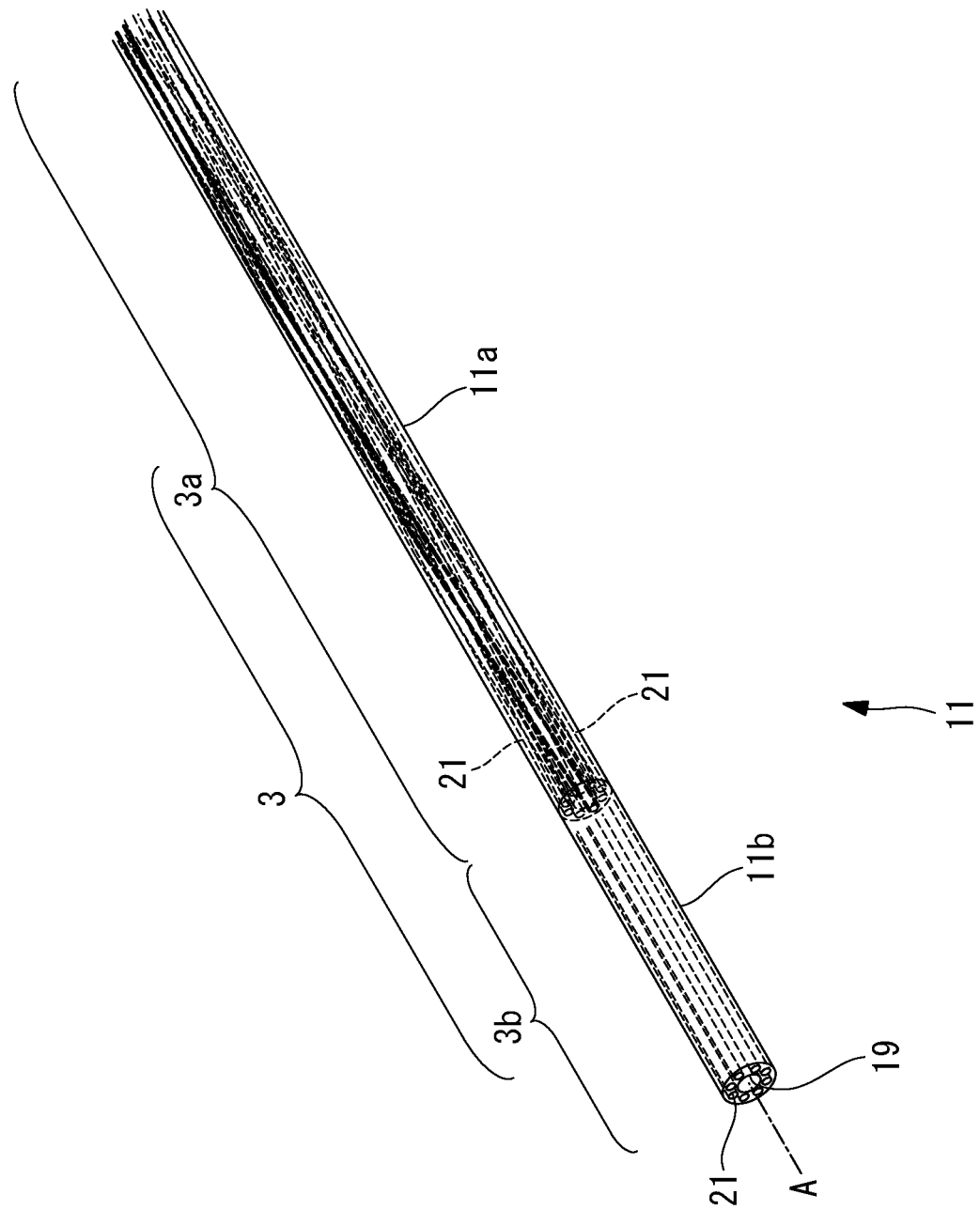
FIG. 6 is a perspective view showing a multi-lumen tube and a distal-end portion in FIG. 5.

As shown in FIGS. 5 and 6, the multi-lumen tube 11 includes an elongated flexible portion 11a having flexibility and a bending portion 11b that is disposed at a distal end of the flexible portion 11a and that is bendable in a direction intersecting a longitudinal axis A of the flexible portion 11a.

The flexible portion 11a and the bending portion 11b are joined by being fused in a state in which the distal end of the flexible portion 11a and a proximal end of the bending portion 11b are connected in a longitudinal axis A direction.

A proximal-end portion of the flexible portion 11a is pulled out from a proximal end of the cover 13 and is disposed inside the operating unit 5.

At a distal-end portion of the bending portion 11b, the distal-end portion 15 is fused and secured thereto. Specifically, as a result of the bending portion 11b, the distal-end portion 15, and the reinforcement member 17 being fused in a state in which an area surrounding a boundary between the distal-end portion of the bending portion 11b and the distal-end portion 15 is covered with the reinforcement member 17, the distal-end portion 15 is joined to the distal-end portion of the bending portion 11b. With the reinforcement member 17, the bending portion 11b and the distal-end portion 15 are more firmly joined with each other, and thus, it is possible to ensure a stable strength therein. Therefore, it is possible to cause the distal-end portion 15 to perform a motion with a higher sensitivity with respect to motions of the flexible portion 11a and the bending portion 11b.

As shown in FIGS. 3, 4, and 5, the flexible portion 11a and the bending portion 11b are provided with: a first lumen 19 that passes through a position containing a center axis of the multi-lumen tube 11 in the longitudinal axis A direction; and a plurality of, for example, eight, second lumens 21 that pass through the multi-lumen tube 11 radially outside the first lumen 19 in the longitudinal axis A direction. The first lumen 19 of the flexible portion 11a and the first lumen 19 of the bending portion 11b form a single continuous through-hole, and the respective second lumens 21 of the flexible portion 11a and the respective second lumens 21 of the bending portion 11b also respectively form continuous through-holes.

The cable 7 of the high-frequency knife 16 is inserted into the first lumen 19. In addition, the first lumen 19 accommodates, in the entire region thereof in the longitudinal direction, a reinforcement coil 23 formed from a material having a greater rigidity than the flexible portion 11a and the bending portion 11b.

A distal-end portion of the cable 7 is secured to the distal-end portion 15. A proximal-end portion of the cable 7 is secured to the operating unit 5 in the state in which the cable 7 is pulled out from the first lumen 19.

In the reinforcement coil 23, one end thereof in the longitudinal direction is secured to the distal-end portion 15 by being bonded thereto or abutted thereagainst, and the other end thereof in the longitudinal direction is secured to an operation handle 27, described later, in the operating unit 5 by being crimped, bonded, or brazed thereto. As the reinforcement coil 23, a so-called round wire coil having a circular sectional shape or a flat wire coil having a rectangular sectional shape is employed. It is preferable that a flat wire coil be employed in view of being capable of reducing the diameter of the multi-lumen tube 11, as compared with a round wire coil. The reinforcement coil 23 is disposed, for example, along an inner surface of the first lumen 19 radially outside the cable 7.

The eight second lumens 21 are disposed with substantially equal spacings therebetween in a circumferential direction about the longitudinal axis A of the multi-lumen tube 11. Of the eight second lumens 21, one bending wire 9 is inserted into each of the four second lumens 21 respectively corresponding to the top, bottom, left, and right of the bending portion 11b. The top-to-bottom direction and the left-to-right direction of the bending portion 11b are directions that are respectively perpendicular to the longitudinal axis A of the multi-lumen tube 11 and that are perpendicular to each other. Nothing is inserted into the remaining four second lumens 21 of the eight second lumens 21 and those second lumens are hollow.

At a distal end of each of the bending wires 9, a sphere 9a, which has an outer diameter that is greater than the outer diameter of a cross-section of a bending wire 9 perpendicular to the longitudinal axis thereof, is provided. As a result of the respective spheres 9a being embedded in the distal-end portion 15, distal-end portions of the respective bending wires 9 are secured to the distal-end portion 15. Proximal-end portions of the respective bending wires 9 are secured to the operating unit 5 in the state in which the respective bending wires 9 are pulled out from the respective second lumens 21. Each of the bending wires 9 can be advanced/retracted in a direction along the longitudinal axis A of the flexible portion 11a. When a bending wire 9 is retracted toward a proximal end thereof, the bending portion 11b is bent in the direction corresponding to the retracted bending wire 9.

As shown in FIG. 6, in the bending portion 11b, the respective second lumens 21 are formed so as to be parallel to each other along the longitudinal direction at positions with substantially equal spacings therebetween in the circumferential direction about the longitudinal axis A. In contrast, as shown in FIG. 6, in the flexible portion 11a, the respective second lumens 21 are formed in spiral shapes about the longitudinal axis A.

When the flexible portion 11a is bent, the shapes of the respective second lumens 21 in the flexible portion 11a also change together with the bending of the flexible portion 11a. As a result of the respective second lumens 21 in the flexible portion 11a having the spiral shapes, it is possible to suppress large changes in the contact states between inner surfaces of the respective second lumens 21 and the respective bending wires 9 caused by the bending state of the flexible portion 11a.

Accordingly, it is possible to eliminate route differences among the respective bending wires 9 generated in the case in which the medical manipulator 1 is inserted into a lumen, such as the large intestine. Therefore, it is not necessary to make motive forces from the operating unit 5 greatly differ among the respective bending wires 9 in accordance with the bent state of the flexible portion 11a, and thus, it is possible to enhance the maneuverability and the controllability of the bending portion 11b.

It is preferable that the respective spiral-shaped second lumens 21 have shapes that are twisted in one direction at a certain pitch and a certain radius. With the spiral-shaped second lumens 21 having a uniform pitch, it is possible to achieve uniform performance in the respective sections of the multi-lumen tube 11, and it is possible to enhance the ease of manufacturing.

As shown in FIG. 5, the cover 13 includes a flexible-portion cover member 13a, which is mainly disposed in an area surrounding the flexible portion 11a, and a bending-portion cover member 13b, which is mainly disposed in an area surrounding the bending portion 11b. In the following, as shown in FIG. 5, of the flexible shaft 3, a portion consisting of the flexible portion 11a and the flexible-portion cover member 13a is assumed to be a shaft flexible portion 3a, and a portion consisting of the bending portion 11b and the bending-portion cover member 13b is assumed to be a shaft bending portion 3b.

A distal-end portion of the flexible-portion cover member 13a is secured to an outer surface of the flexible portion 11a and a proximal-end portion thereof is secured to the operating unit 5. A distal-end portion of the bending-portion cover member 13b is secured to the distal-end portion 15 and a proximal-end portion thereof is secured to the outer surface of the flexible portion 11a by being bonded thereto. The flexible-portion cover member 13a and the bending-portion cover member 13b are integrally formed by being fused in a state in which end surfaces of the respective members are connected with each other, in other words, in a state in which a distal-end surface of the flexible-portion cover member 13a and a proximal-end surface of the bending-portion cover member 13b are connected in the longitudinal axis A direction.

The bending-portion cover member 13b is formed of a material having a greater flexibility than the flexible-portion cover member 13a. The bending-portion cover member 13b is secured to a side surface of a distal-end portion of a rotational-force transmission coil 33, described later, by being bonded or fused thereto. In addition, it is desirable that the flexible-portion cover member 13a and the bending-portion cover member 13b both be formed of an insulating material. For example, a low-density polyethylene is employed as a material for the flexible-portion cover member 13a and, for example, a styrene-based elastomer is employed as a material for the bending-portion cover member 13b.

As a result of the bending-portion cover member 13b being more flexible than the flexible-portion cover member 13a, it is possible to more smoothly bend the shaft bending portion 3b. In addition, as a result of the flexible-portion cover member 13a and the bending-portion cover member 13b both having insulating properties, in the case in which a high-frequency knife 16 is employed as an end effector, it is possible to prevent the high-frequency current of the high-frequency knife 16 from energizing the medical manipulator 1 or externally leaking from the medical manipulator 1.

Figure 7:
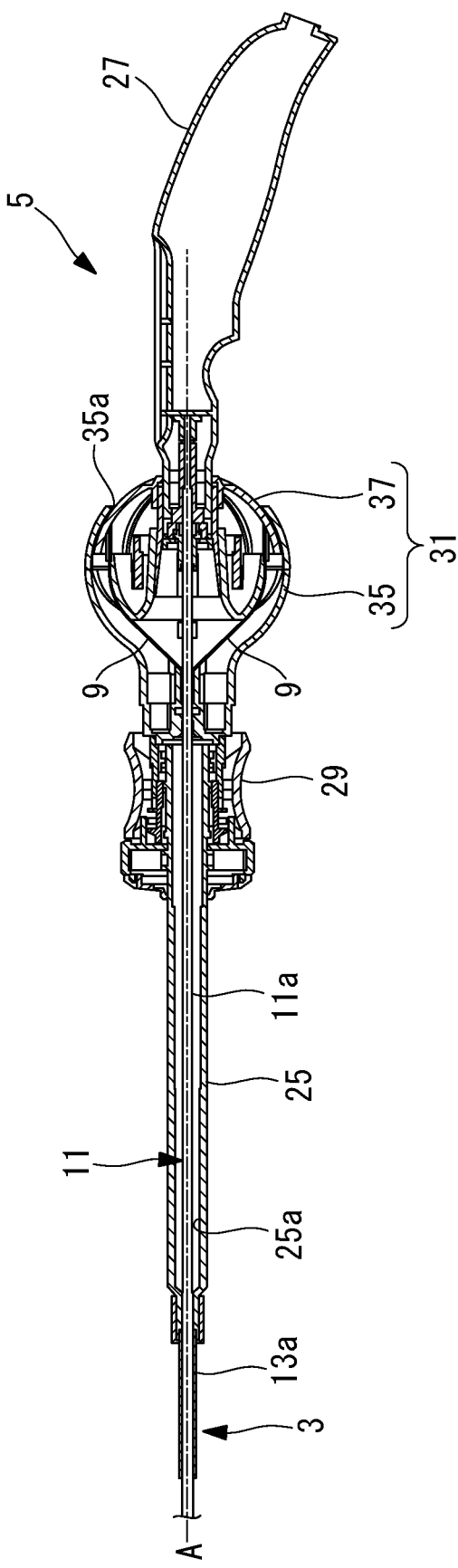
FIG. 7 is a sectional view in which an operating unit in FIG. 2 is cut in the longitudinal axis direction.

As shown in FIGS. 2 and 7, the operating unit 5 includes: a rigid rotation shaft 25 that extends so as to be coaxial with the flexible shaft 3; the operation handle 27 that is disposed on a proximal-end side of the rotation shaft 25 and that is gripped by the operator P; a rotational operation portion 29 that is secured to a proximal end of the rotation shaft 25 and that is for causing the flexible shaft 3 and the rotation shaft 25 to be rotated; a bending operation portion 31 that is disposed between the rotational operation portion 29 and the operation handle 27 and that is for causing the bending portion 11b of the multi-lumen tube 11 to be bent; and the rotational-force transmission coil 33 that transmits a rotational force to the flexible shaft 3 (see FIGS. 3 and 5).

The rotation shaft 25 has a shaft through-hole 25a that passes therethrough along the longitudinal axis A. The proximal-end portion of the flexible-portion cover member 13a is secured to the distal-end portion of the shaft through-hole 25a. In addition, the flexible portion 11a of the multi-lumen tube 11 pulled out from the proximal end of the flexible-portion cover member 13a passes through the shaft through-hole 25a.

The bending operation portion 31 has a ball joint structure having a substantially spherical hollow socket 35 and a substantially spherical hollow ball 37 engaged with the socket 35, in the interior thereof, in a rotatable manner.

The socket 35 is connected to the proximal end of the rotation shaft 25. The socket 35 has a shape in which a portion of the sphere on a proximal-end side is cut out along a plane orthogonal to the longitudinal axis A of the rotation shaft 25. The cutout proximal-end surface of the socket 35 is open. The cutout proximal-end surface of the socket 35 is assumed to be an opening 35a. The socket 35 is formed in a spherical shape larger than a hemisphere. Accordingly, the ball 37 is held inside the socket 35 without falling out of the opening 35a of the socket 35.

The ball 37 is supported by an inner surface of the socket 35 at a position at which a center point of the ball 37 is aligned with a center point of the socket 35. Accordingly, the ball 37 is rotatable in an arbitrary direction about the center points with respect to the socket 35.

The operation handle 27 is connected to an outer surface of the ball 37 exposed to the exterior from the opening 35a of the socket 35 and extends toward the opposite side from the rotation shaft 25 and the socket 35.

As shown in FIG. 7, at the neutral position, the operation handle 27 is aligned with the rotation shaft 25 in a straight line. In addition, the operation handle 27 is tilted in an arbitrary direction about the center points of the socket 35 and the ball 37 due to the rotation of the ball 37 in the socket 35.

In the socket 35, a proximal end of the flexible portion 11a of the multi-lumen tube 11, passing through the shaft through-hole 25a, is secured to a distal-end portion of the operation handle 27. The cable 7 pulled out from the first lumen 19 of the flexible portion 11a is connected to the operation handle 27. For example, as a result of an input to a button or the like included in the operation handle 27, a current flows through the cable 7, and the high-frequency knife is energized.

In addition, the four bending wires 9 pulled out from the second lumen 21 of the flexible portion 11a are disposed between the inner surface of the socket 35 and the outer surface of the ball 37. In the state in which the operation handle 27 is disposed at the neutral position, the respective proximal ends of the four bending wires 9 are secured to the outer surface of the ball 37 at positions with substantially equal spacings therebetween in the circumferential direction about the longitudinal axis A.

For example, when the operation handle 27 is tilted in the right direction, the bending portion 11b of the multi-lumen tube 11 bends leftward as a result of the left bending wire 9 being pulled and the right bending wire 9 being pushed out due to the rotation of the ball 37 in the right direction. When the operation handle 27 is tilted in the left direction, the bending portion 11b bends rightward as a result of the right bending wire 9 being pulled and the left bending wire 9 being pushed out due to the rotation of the ball 37 in the left direction. At this time, because the top and bottom bending wires 9 are not pulled or pressed by the ball 37, the angle of the bending portion 11b in the top-to-bottom direction does not change.

When the operation handle 27 is tilted in the top direction, the bending portion 11b bends downward as a result of the bottom bending wire 9 being pulled and the top bending wire 9 being pushed out due to the rotation of the ball 37 in the top direction. When the operation handle 27 is tilted in the bottom direction, the bending portion 11b bends upward as a result of the top bending wire 9 being pulled and the bottom bending wire 9 being pushed out due to the rotation of the ball 37 in the bottom direction. At this time, because the left and right bending wires 9 are not pulled or pressed by the ball 37, the angle of the bending portion 11b in the left-to-right direction does not change.

The rotational operation portion 29 is a rotating handle that is disposed so as to be coaxial with the rotation shaft 25. The rotational operation portion 29 is provided with a locking mechanism (not shown) for locking the rotation of the rotational operation portion 29 with respect to the bending operation portion 31 and the operation handle 27.

The rotational-force transmission coil 33 consists of, for example, three layers of coils disposed in a laminated state in a radial direction. As shown in FIG. 5, the rotational-force transmission coil 33 is disposed, for example, between the flexible portion 11a of the multi-lumen tube 11 and the flexible-portion cover member 13a thereof along the longitudinal axis A. One end of the rotational-force transmission coil 33 in the longitudinal direction is secured to the distal end of the flexible portion 11a and the other end thereof in the longitudinal direction is secured to the rotation shaft 25.

When the rotational operation portion 29 is rotated about the longitudinal axis A, the flexible shaft 3 and the rotation shaft 25 rotate about the longitudinal axis A. Specifically, due to the rotation of the rotational operation portion 29, the rotation shaft 25 rotates about the longitudinal axis A with respect to the bending operation portion 31 and the operation handle 27. When the rotation shaft 25 rotates, the rotational force about the longitudinal axis A is transmitted to the proximal-end portion of the flexible-portion cover member 13a connected to the rotation shaft 25, and the rotational force about the longitudinal axis A is transmitted to a distal-end portion of the flexible portion 11a by the rotational-force transmission coil 33 connected to the rotation shaft 25. Accordingly, the entire flexible shaft 3, including the bending portion 11b, rotates about the longitudinal axis A together with the rotational operation portion 29 and the rotation shaft 25.

Next, the operation of the medical manipulator 1, configured as described above, will be described.

In order to treat biological tissue inside a body of the patient O by using the medical manipulator 1 according to this embodiment, the flexible shaft 3 is inserted into the body via a channel of the endoscope 120 or a channel externally provided on the endoscope 120. Then, the flexible shaft 3 is disposed at a position at which a distal-end portion of the flexible shaft 3 is observed in an endoscope image.

The operator P rotates the flexible shaft 3 about the longitudinal axis A by means of the rotational operation of the rotational operation portion 29. In addition, the operator P bends the shaft bending portion 3b in an arbitrary direction intersecting the longitudinal axis A by means of the tilting operation of the operation handle 27.

Here, in accordance with the tilting operation of the operation handle 27, stresses such as friction act on the respective second lumens 21 as a result of the respective bending wires 9 corresponding to the tilting direction of the operation handle 27 being pushed and pulled in the respective second lumens 21. In particular, as a result of the second lumens 21 being formed in the spiral shapes in the flexible portion 11a of the multi-lumen tube 11, the stresses such as friction acting on the respective second lumens 21 increase as compared with a case in which the second lumens 21 are not formed in the spiral shapes.

With the medical manipulator 1 according to this embodiment, the reinforcement coil 23, in which the two ends thereof in the longitudinal direction are secured to the distal-end portion 15 and the operating unit 5, respectively, and that is formed from a material having a greater rigidity than the flexible portion 11a and the bending portion 11b, is disposed over the entire length of the first lumen 19 that passes through both the flexible portion 11a and the bending portion 11b of the multi-lumen tube 11.

Therefore, even if stresses such as friction act on the respective second lumens 21 as a result of pulling the respective bending wires 9, it is possible to prevent, by means of the reinforcement coil 23, the occurrence of compressive deformation both in the flexible portion 11a and the bending portion 11b. Accordingly, it is possible to enhance the maneuverability of the bending portion 11b and to bend the shaft bending portion 3b in a desired shape.

For example, with reference to FIG. 8, the effect of the reinforcement coil 23 will be described. In the case in which the reinforcement coil 23 is disposed over the entire length of the multi-lumen tube 11, compressive deformation does not occur in either the flexible portion 11a or the bending portion 11b even if the bending wires 9 are pulled, and the bending portion 11b bends in a preferable manner due to the pulling of the bending wires 9. In this case, because the multi-lumen tube 11 is not compressively deformed, the amounts by which the bending wires 9 are pulled, in other words, the distances by which the bending wires 9 are pulled are kept small, and insertion into the endoscope channel is also facilitated.

In contrast, as a comparative example, in the case in which the reinforcement coil 23 is not provided in any part of the multi-lumen tube 11, when the bending wires 9 are pulled, the bending portion 11b does not bend, and thus, compressive deformation occurs both in the flexible portion 11a and in the bending portion 11b. In this case, the compressive deformation of the multi-lumen tube 11 increases with an increase in the pulling of the bending wires 9; therefore, the amounts by which the bending wires 9 are pulled increase. In addition, because the multi-lumen tube 11 is easily compressively deformed, the insertion into the endoscope channel is difficult.

Note that, in the case in which the reinforcement coil 23 is provided only in the flexible portion 11a, compressive deformation does not occur in the flexible portion 11a even if the bending wires 9 are pulled. Accordingly, as compared with the case in which the reinforcement coil 23 is not provided, the amounts by which the bending wires 9 are pulled are kept small, and, in addition, the insertion into the endoscope channel is also facilitated. However, the bending portion 11b does not bend and compressive deformation occurs therein.

In this embodiment, the rotational-force transmission coil 33 is disposed between the flexible portion 11a and the flexible-portion cover member 13a. Although the rotational-force transmission coil 33 may be provided in each second lumen 21, as a result of disposing the rotational-force transmission coil 33 between the flexible portion 11a and the flexible-portion cover member 13a, it is possible to easily rotate the entire multi-lumen tube 11 about the longitudinal axis A.

In this embodiment, the second lumens 21 of the flexible portion 11a have spiral shapes. Alternatively, the second lumens 21 of the flexible portion 11a may be disposed so as to be, as with the second lumens 21 of the bending portion 11b, parallel to each other along the longitudinal direction at positions with equal spacings therebetween in the circumferential direction about the longitudinal axis A.

As has been described above, although an embodiment of the present invention has been described in detail with reference to the drawings, the specific configuration thereof is not limited to this embodiment, and design alterations within a range that do not depart from the scope of the present invention are also encompassed.

The following aspects can be also derived from the embodiments.

An aspect of the present invention is a medical manipulator including: a multi-lumen tube that includes an elongated flexible portion having flexibility and a bendable bending portion disposed at a distal end of the flexible portion; a distal-end portion disposed at a distal end of the bending portion; a proximal-end portion disposed at a proximal end of the flexible portion; a plurality of wires that cause the bending portion to be bent by transmitting a motive force from the proximal-end portion to the bending portion; and a reinforcement coil that is formed from a material having a greater rigidity than the flexible portion and the bending portion and in which one end thereof in a longitudinal direction is secured to the distal-end portion and the other end thereof in the longitudinal direction is secured to the proximal-end portion, wherein the flexible portion and the bending portion include a first lumen, which passes through, in the longitudinal direction, the multi-lumen tube at a position containing a center axis thereof and into which the reinforcement coil is inserted, and a plurality of second lumens, which pass through, in the longitudinal direction, the multi-lumen tube at positions farther outside than the first lumen is and into which the plurality of wires are inserted.

With this aspect, the bending portion is bent as a result of the motive force from the proximal-end portion being transmitted to the bending portion by the plurality of wires passing through the second lumens in the flexible portion and the bending portion constituting the multi-lumen tube.

In the flexible portion and the bending portion, the reinforcement coil in which the two ends thereof in the longitudinal direction are secured to the distal-end portion and the proximal-end portion and that is formed from a material having a greater rigidity than the flexible portion and the bending portion is disposed in the first lumen formed at the position containing the center axis of the multi-lumen tube. Therefore, even if stresses such as friction act on the respective second lumens as a result of pulling the respective wires, it is possible to prevent, by means of the reinforcement coil, the occurrence of compressive deformation both in the flexible portion and the bending portion.

Accordingly, it is possible to enhance the maneuverability of the bending portion and to bend the bending portion in a desired shape.

With the medical manipulator according to the above-described aspect, the plurality of second lumens passing through the flexible portion may be formed in spiral shapes about a longitudinal axis of the flexible portion.

As a result of the flexible portion, having flexibility, bending in accordance with a shape inside a lumen of a living body into which the multi-lumen tube is inserted, the shapes of the plurality of second lumens of the flexible portion also change together with the bending of the flexible portion. As a result of the respective second lumens of the flexible portion having the spiral shapes about the longitudinal axis of the flexible portion, the contact states between inner surfaces of the respective second lumens and the respective wires inside the respective second lumens do not change greatly depending on the bent state of the flexible portion, and it is possible to suppress the occurrences of route differences among the respective wires. Accordingly, it is not necessary to make motive forces from the proximal-end portion greatly differ among the wires in accordance with the bent state of the flexible portion. Therefore, it is possible to enhance the maneuverability and the controllability of the bending portion.

The medical manipulator according to the above-described aspect may include a cover that covers an area surrounding the multi-lumen tube, wherein the cover may include a flexible-portion cover member that is disposed in an area surrounding the flexible portion and a bending-portion cover member that is formed from a material having a greater flexibility than the flexible-portion cover member and that is disposed in an area surrounding the bending portion.

It is possible to protect the multi-lumen tube by means of the cover. In this case, as a result of the bending-portion cover member being formed from a material having a greater flexibility than the flexible-portion cover member, it is possible to more smoothly bend the bending portion of the multi-lumen tube.

With the medical manipulator according to the above-described aspect, the flexible-portion cover member and the bending-portion cover member may be formed of an insulating material.

With this configuration, in the case in which a high-frequency knife is employed as the distal-end portion, it is possible to prevent, by means of the flexible-portion cover member and the bending-portion cover member consisting of an insulating material, the high-frequency current of the high-frequency knife from energizing the manipulator or externally leaking from the manipulator.

The medical manipulator according to the above-described aspect may include a rotational-force transmission coil that extends along a longitudinal direction of the flexible portion and that transmits a rotational force about a longitudinal axis of the flexible portion from the proximal-end portion to the flexible portion, wherein the rotational-force transmission coil may be disposed between the flexible portion and the flexible-portion cover member, one end thereof in a longitudinal direction may be secured to the distal end of the flexible portion, and the other end thereof in the longitudinal direction may be secured to the proximal-end portion.

As a result of the rotational force about the longitudinal axis of the flexible portion from the proximal-end portion being transmitted to the flexible portion by the rotational-force transmission coil, the entire multi-lumen tube is rotated about the longitudinal axis.

In this case, as a result of disposing the rotational-force transmission coil between the flexible portion and the flexible-portion cover member, it is possible to easily rotate the entire multi-lumen tube about the longitudinal axis, as compared with a case in which the rotational-force transmission coil is provided in each second lumen.

The medical manipulator according to the above-described aspect may include a reinforcement member that covers an area surrounding a boundary between the bending portion and the distal-end portion.

With the reinforcement member, the bending portion and the distal-end portion are more firmly connected with each other. Therefore, it is possible to cause the distal-end portion to perform a motion with a higher sensitivity with respect to motions of the flexible portion and the bending portion.

REFERENCE SIGNS LIST 1 medical manipulator
5 operating unit (proximal-end portion)
7 cable 9 bending wire (wire)
11 multi-lumen tube
11a flexible portion
11b bending portion
13 cover
13a flexible-portion cover member
13b bending-portion cover member
15 distal-end portion
17 reinforcement member
19 first lumen
21 second lumen
23 reinforcement coil
33 rotational-force transmission coil

The invention claimed is:

1. A medical manipulator comprising:
a multi-lumen tube that includes an elongated flexible portion having flexibility and a bendable bending portion disposed at a distal end of the flexible portion;
a distal-end portion disposed at a distal end of the bending portion;
a proximal-end portion disposed at a proximal end of the flexible portion;
a plurality of wires that cause the bending portion to be bent by transmitting a motive force from the proximal-end portion to the bending portion;
a reinforcement coil in which one end thereof in a longitudinal direction is secured to the distal-end portion and the other end thereof in the longitudinal direction is secured to the proximal-end portion;
a flexible-portion cover member that is disposed in an area surrounding the flexible portion; and
a bending-portion cover member that is disposed in an area surrounding the bending portion and that is formed from a material having a greater flexibility than the flexible-portion cover member, wherein
the flexible portion and the bending portion include a first lumen, which passes through, in the longitudinal direction, the multi-lumen tube at a position containing a center axis thereof and into which the reinforcement coil is inserted, and a plurality of second lumens, which pass through, in the longitudinal direction, the multi-lumen tube at positions farther outside than the first lumen is and into which the plurality of wires are inserted,
the reinforcement coil is disposed along an inner surface of the first lumen,
the plurality of second lumens passing through the flexible portion are formed in spiral shapes about a longitudinal axis of the flexible portion, and
the plurality of second lumens passing through the bending portion are formed extending linearly and parallel to a longitudinal axis of the bending portion.

2. The medical manipulator according to claim 1, wherein the flexible-portion cover member and the bending-portion cover member are formed of an insulating material.

3. The medical manipulator according to claim 1, further comprising a rotational-force transmission coil that extends along a longitudinal direction of the flexible portion and that transmits a rotational force about a longitudinal axis of the flexible portion from the proximal-end portion to the flexible portion,
wherein the rotational-force transmission coil is disposed between the flexible portion and the flexible-portion cover member, one end thereof in a longitudinal direction is secured to the distal end of the flexible portion, and the other end thereof in the longitudinal direction is secured to the proximal-end portion.

4. The medical manipulator according to claim 1, further comprising a reinforcement member that covers an area surrounding a boundary between the bending portion and the distal-end portion.

5. The medical manipulator according to claim 1, wherein the reinforcement coil is formed from a material having a greater rigidity than the flexible portion and the bending portion.

6. The medical manipulator according to claim 1, wherein the reinforcement coil comprises a flat wire coil having a rectangular sectional shape.

7. The medical manipulator according to claim 1, wherein the plurality of second lumens passing through the bending portion are disposed with equal spacings therebetween about the longitudinal axis of the bending portion.

8. The medical manipulator according to claim 1, wherein
the flexible-portion cover member is formed of a low-density polyethylene, and
the bending-portion cover member is formed of a styrene-based elastomer.

9. The medical manipulator according to claim 1, wherein a cable of a high-frequency knife is inserted into the first lumen.

10. The medical manipulator according to claim 1, wherein a wire for driving a gripping forceps to be opened/closed is inserted into the first lumen.

11. The medical manipulator according to claim 1, further comprising an operating unit configured to be manually operated by an operator.

* * * * *